June 24, 1947.

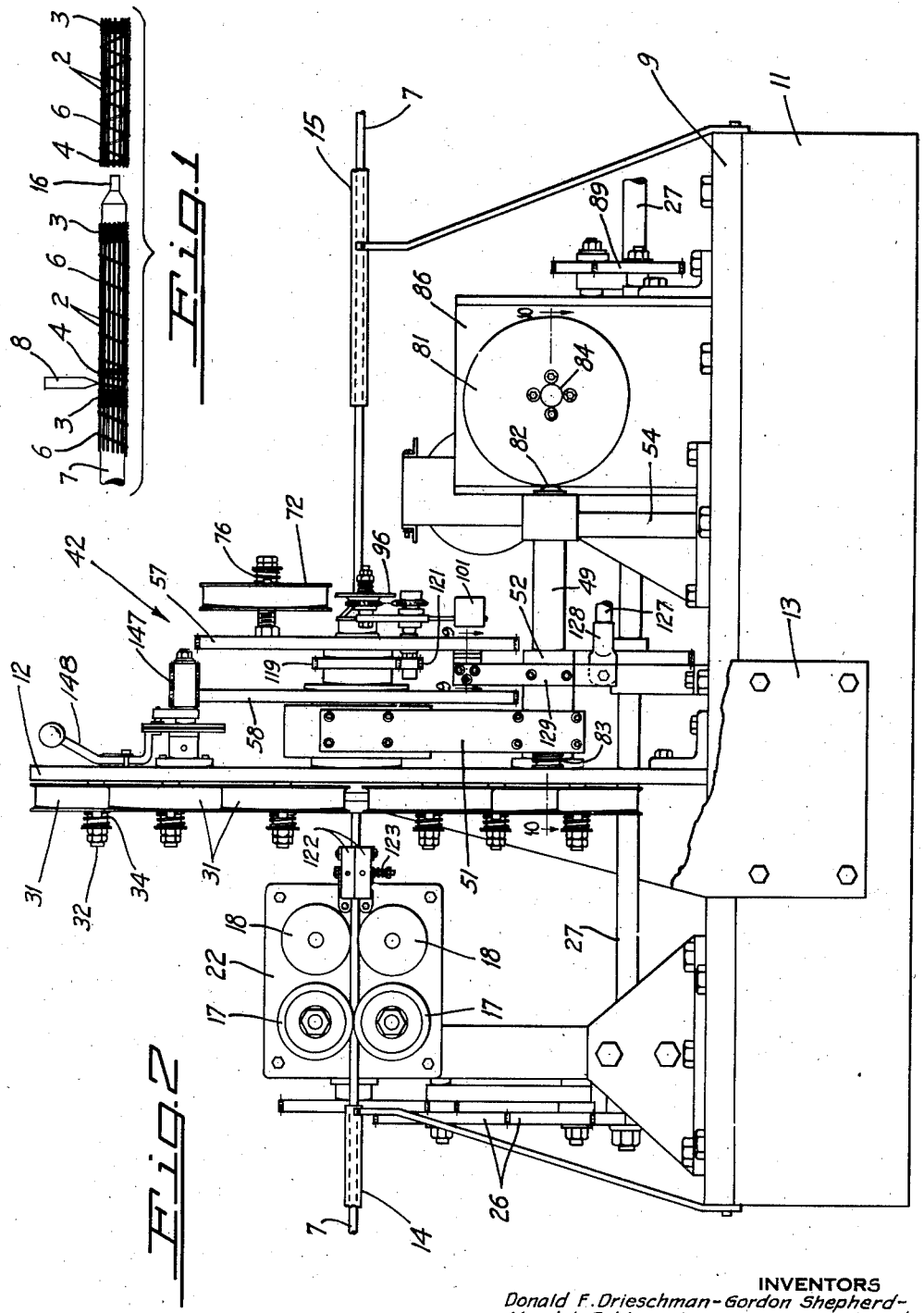

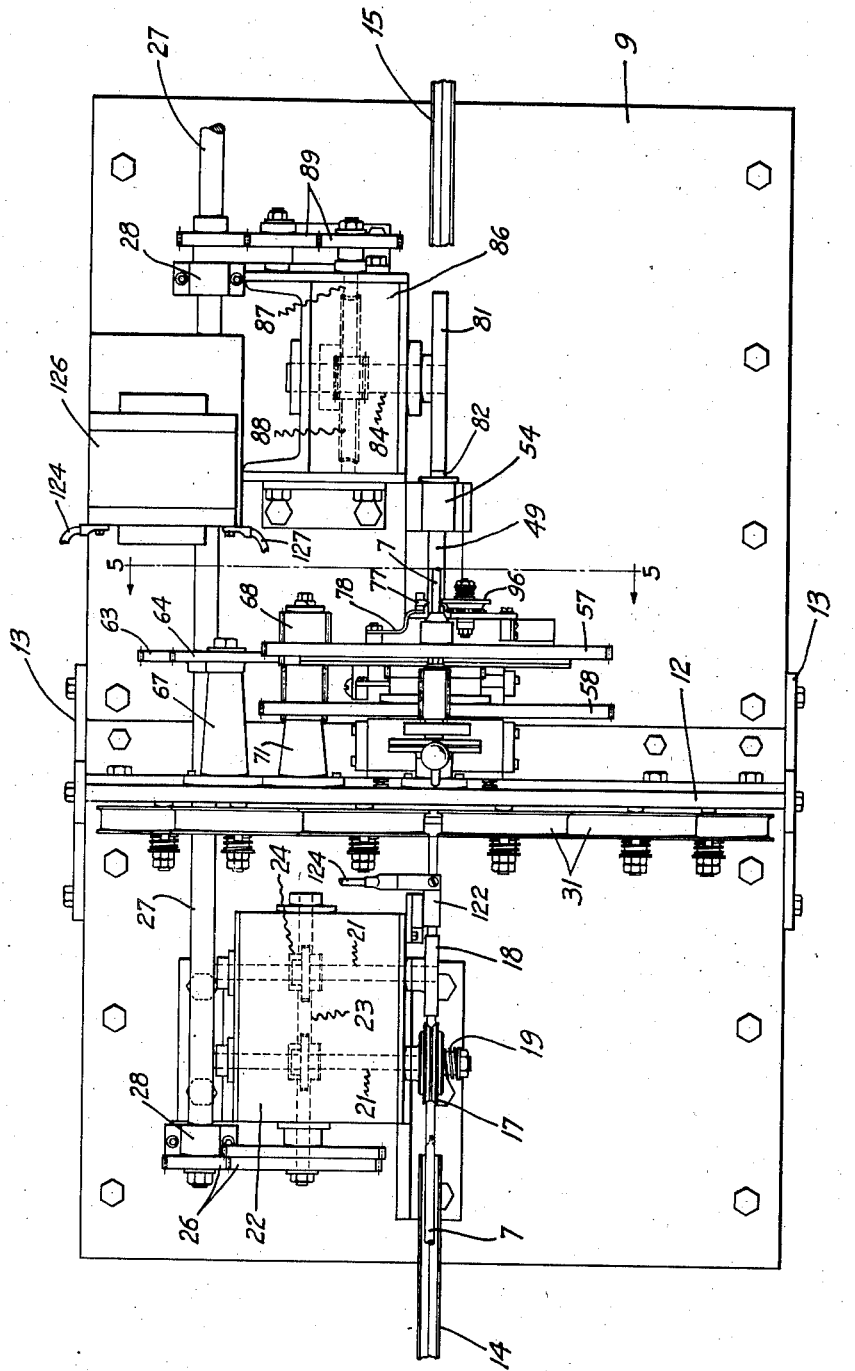

D. F. DRIESCHMAN ET AL 2,422,827

METHOD OF MAKING GRIDS

Filed March 11, 1944

INVENTORS
Donald F. Drieschman-Gordon Shepherd
Mendel Rabinowitz-Almer M. Newhall Jr.
BY Harold E. Sorg.

ATTORNEY

June 24, 1947.  D. F. DRIESCHMAN ET AL  2,422,827
METHOD OF MAKING GRIDS
Filed March 11, 1944    8 Sheets-Sheet 6

INVENTORS
Donald F. Drieschman-Gordon Shepherd-
Mendel Rabinawitz-Almer M. Newhall Jr.
BY      Harold E. Sorg.

Harold E. Sorg
ATTORNEY

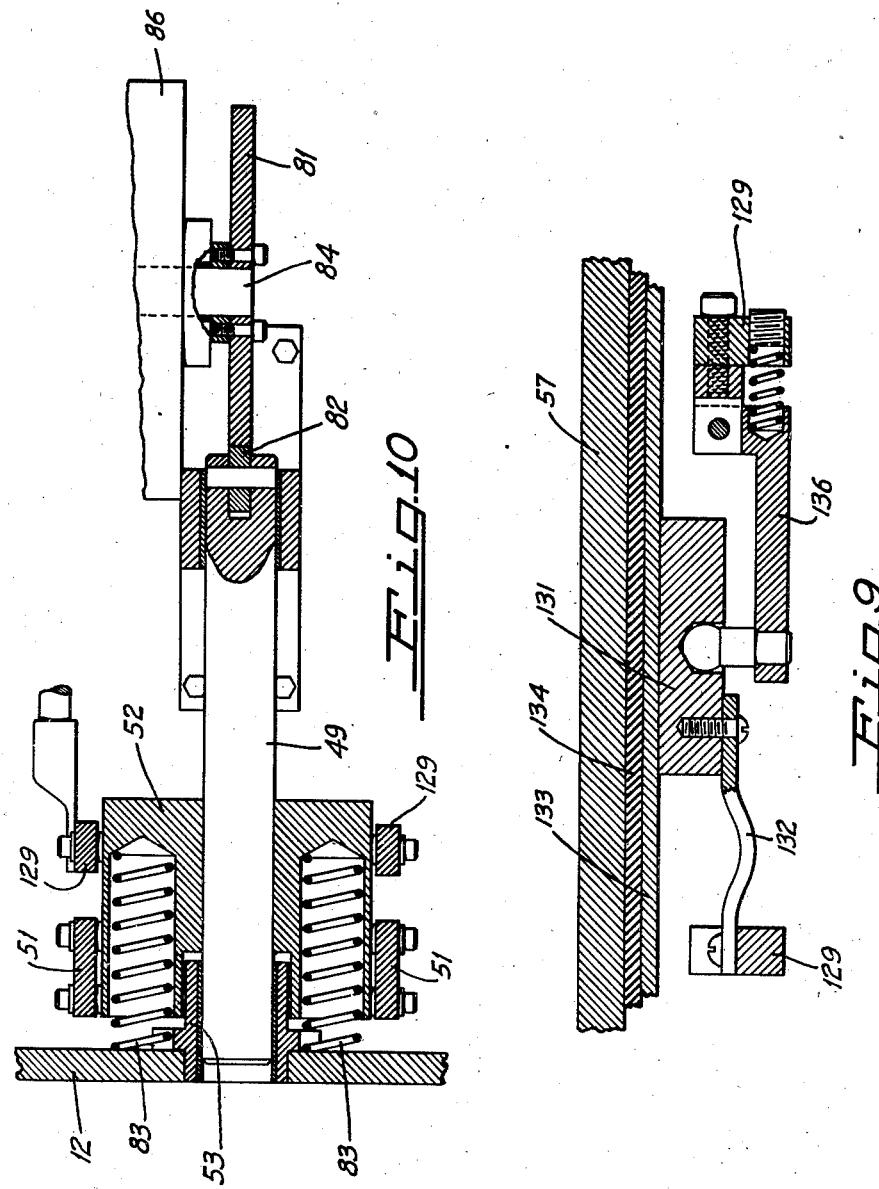

Patented June 24, 1947

2,422,827

UNITED STATES PATENT OFFICE 2,422,827

METHOD OF MAKING GRIDS

Donald F. Drieschman, San Carlos, Gordon Shepherd, Burlingame, Mendel Rabinawitz, San Francisco, Almer M. Newhall, Jr., Palo Alto, and Harold E. Sorg, Redwood City, Calif., assignors to Eitel-McCullough, Inc., San Bruno, Calif., a corporation of California Application March 11, 1944, Serial No. 526,093

3 Claims. (Cl. 140—71.5)

Our invention relates to a method of making grid electrodes for electron tubes. This application covers the process, the machine being claimed in our copending application, Serial No. 526,092, now Patent No. 2,411,988, Dec. 3, 1946, and the product being claimed in our copending application Serial No. 526,091, filed March 11, 1944.

It is among the objects of our invention to provide a method for continuously making grids, whereby the latter are produced more rapidly, with less labor and under controlled conditions yielding a uniform product.

The invention possesses other objects and features of advantage, some of which, with the foregoing, will be set forth in the following description of our invention. It is to be understood that we do not limit ourselves to this disclosure of species of our invention as we may adopt variant embodiments thereof within the scope of the claims.

Referring to the drawings:

Figure 1 is a side elevational view showing a completed grid and also a series of grids as made on a mandrel by our method.

Figure 2 is a side elevational view of a machine for carrying out our method; and Figure 3 is a plan view of the same.

Figure 9 is a fragmentary sectional view showing the slide contactor for the winding head, taken in a plane indicated by line 9—9 of Figure 2.

Figure 10 is a detail sectional view of the cam mechanism which controls axial movement of the winding head, taken in a plane indicated by line 10—10 of Figure 2.

Figure 4:
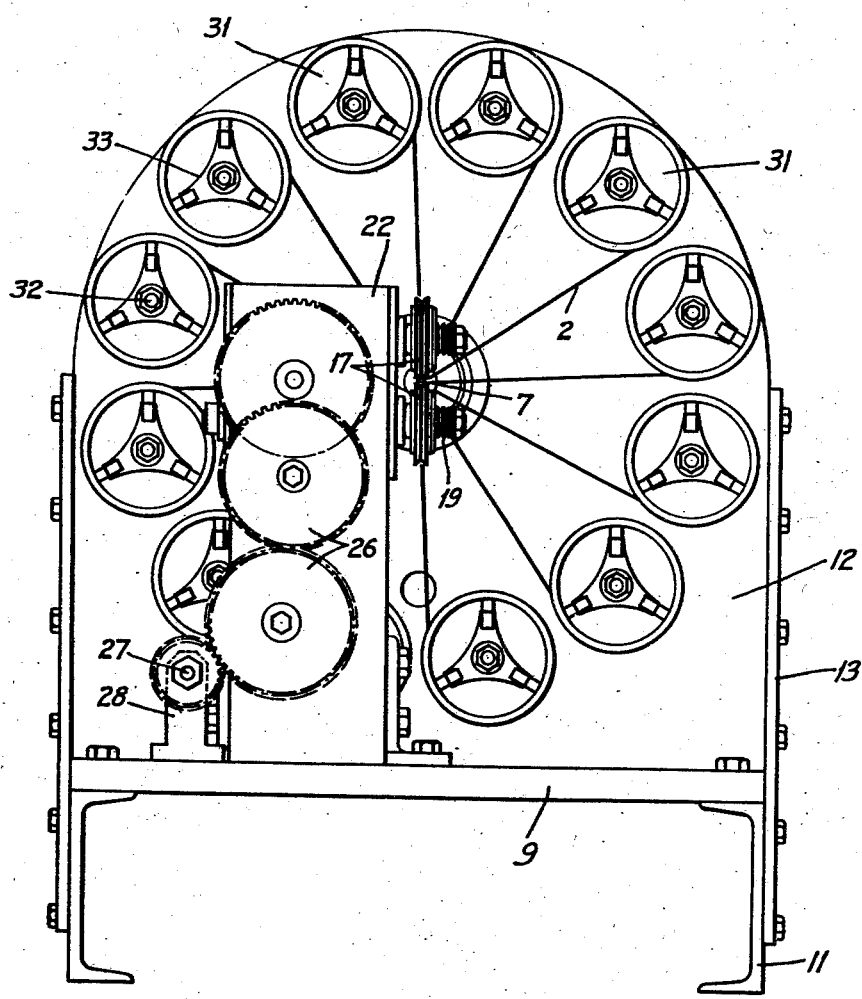
Figure 4 is a rear end elevational view showing the supply rolls for laying the longitudinal grid bars on the mandrel.

In terms of broad inclusion, our grid making method comprises the steps of laying a plurality of wires longitudinally of an axis to form bars for a connected series of grids, winding another wire helically about the bars, and then uniting the wires at their intersections. By this method the grids may be formed continuously on a mandrel. Our preferred method also includes the step of varying the pitch of the winding at intervals along the axis, and controlling the pitch varying means to provide close-turn end rings on the grids and open turn helices between the end rings. After a series of grids have been made the wires between adjacent end rings are severed to separate the grids.

In greater detail, and referring to Figure 1 of the drawings, our method is concerned with the fabrication of a grid comprising a plurality of longitudinal wire bars 2 spaced about the grid axis. These bars are parallel and lie in cylindrical formation about the axis. The longitudinal grid bars are held by another wire wound about and welded to the bars, this winding being applied to form close-turn end rings 3 and 4 on each grid and an open-turn helix 6 between the end rings. Base ring 3 to which the grid supports are usually connected is preferably wider than the top ring, governed by the number of close turns provided, as shown on the completed grid at the right in Figure 1.

This grid structure is adapted for being made continuously on a mandrel 7 by simply laying the longitudinal wires 2 to form a connected series of grids and then forming the end rings 3 and 4 and helices 6 by a continuous winding operation. After the winding has been applied and welded the wires are severed in transverse planes between adjacent end rings to separate the grids. This severing may be done by any suitable means as by a knife 8. As the mandrel may be injured by this cutting operation we prefer to strip the connected grids from the winding mandrel and slip them on a core of harder material. Our method is best illustrated in conjunction with the machine hereinafter described, it being understood however that the process may be carried out by other mechanisms or by hand.

Figure 6:
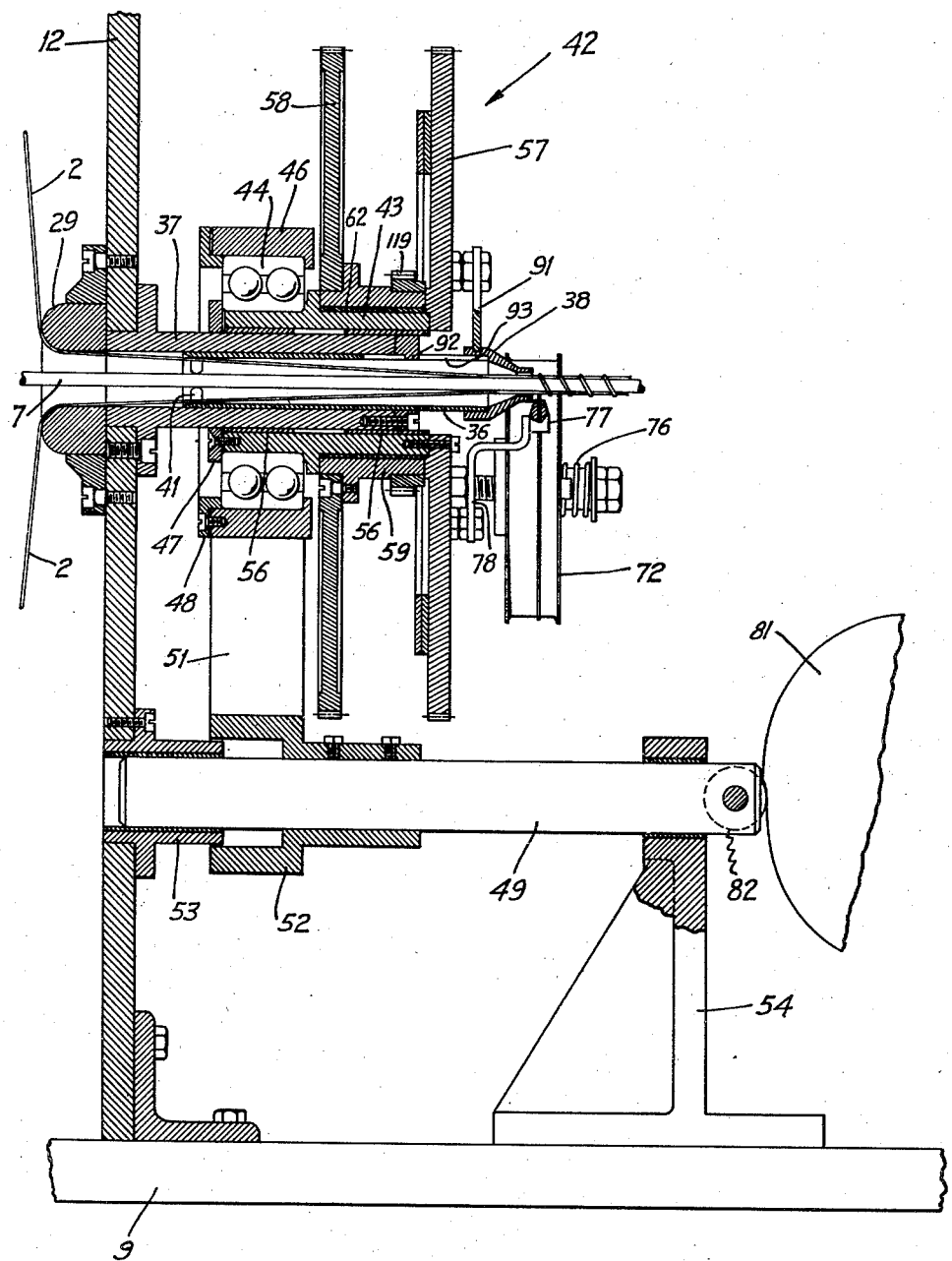
Figure 6 is a longitudinal vertical sectional view taken in a plane axially of the mandrel through the winding head.

*Frame structure and mandrel guides.*—Referring to Figures 2 and 3, the machine chosen for purposes of illustration comprises a fixed frame including a bed plate 9 supported on side channels 11 and carrying a transverse upright plate 12 between braces 13, upon which the various components of the apparatus are mounted. A central aperture is provided in plate 12 through which mandrel 7 advances (Fig. 6). For convenience in making the grids a plurality of mandrels are employed, each about three feet long. These are held in axial alignment on opposite sides of plate 12 by V-shaped guides 14 and 15. One mandrel section follows immediately behind the other so that in effect a continuous mandrel is provided. A flat tip 16 on one end of each mandrel section engages a slot in the end of another section to restrain the mandrels against relative rotation.

*Mandrel feed mechanism.*—Means are provided for feeding the mandrels axially through the machine. For this purpose two sets of drive rollers 17 and 18 are arranged to engage opposite sides of the mandrels, the rear set 17 being driven at a slightly faster rate to insure tight abutment of the mandrel sections. Rollers 17 are frictionally held on their shafts by springs 19 to allow for a degree of slippage. Figures 2 and 3 show these drive rollers mounted on shafts 21 journaled in a gear box 22. A cross shaft 23 is geared to the roll shafts by worm drives 24, the cross shaft being connected through a gear train 26 to the main drive shaft 27 extending along the bed of the machine and journaled in bearings 28. By this driving arrangement the mandrels are axially moved at a constant speed through the wire winding mechanism.

*Longitudinal wire laying mechanism.*—Means are provided for laying wires 2 longitudinally of the mandrel. As best shown in Figures 4 and 6, a circular guide collar 29 is disposed about the mouth of the aperture in plate 12 for directing the wires inwardly along the mandrel. Wires 2 are drawn from a series of supply rolls or reels 31 circumferentially spaced about the mandrel axis and journaled on stub shafts 32 projecting from the rear of plate 12. These reels are frictionally held by spiders 33 pressed by springs 34. Wires 2 pass through a sleeve 36 slidably mounted in a hollow hub 37 which projects from the front side of plate 12. A guide tip 38 on sleeve 36 slidably engages the mandrel to support the latter and has a series of radial guide slots 39 through which the wires pass. Centering lugs 41 projecting inwardly adjacent the rear end of sleeve 36 serve as another support for the mandrel. See Figures 5, 6 and 8.

*Wire winding mechanism.*—Means are provided for applying the helical winding on the grids. For this purpose a winding head generally indicated by numeral 42 is mounted for rotation about the mandrel. This head comprises a center sleeve 43 encircling hub 37 and journaled in a main bearing 44 held by a housing 46, the bearing assembly being retained by rings 47 and 48. In order to permit axial as well as rotational movement of the winding head, bearing housing 46 is supported on a slide rod 49 by arms 51 fastened to a block 52 secured to the rod. Slidable support for the rod is provided by a collar 53 on plate 12 and a forward bracket 54 on bed plate 9. Centering of sleeve 43 on hub 37 is maintained by bearing rings 56. See Figure 6.

Figure 11:
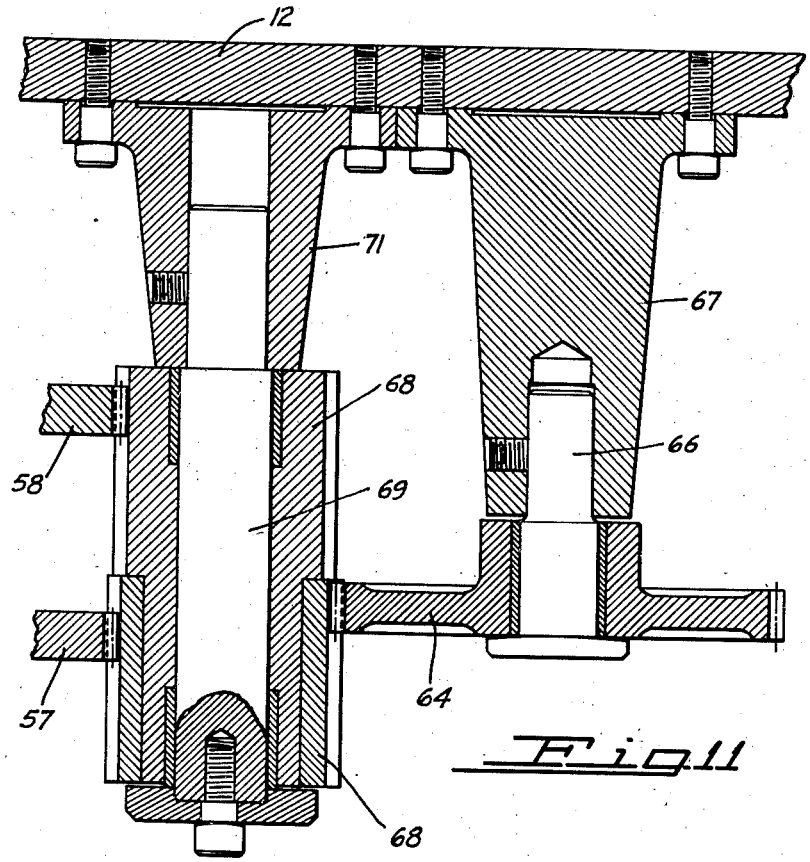
Figure 11 is a detail sectional view of the winding head drive gearing, taken in a plane indicated by line 11—11 of Figure 5.

A pair of large gears including a front gear 57 and a back gear 58 are embodied in the winding head mechanism. Front gear 57 runs at the speed of the head and is fixed to center sleeve 43. Back gear 58 is fixed to a second sleeve 59 which is loosely journaled on center sleeve 43 by a bearing ring 62. The back gear is used for driving part of the welding device as hereinafter described. Both gears are rotated from main drive shaft 27 by a gear 63 on the latter meshing with an idler 64 journaled on stub shaft 66 projecting from bracket 67 secured to plate 12. See Figures 5 and 11. Idler 64 meshes with a double gear 68 which has a section of one diameter engaging front gear 57 and a section of another diameter engaging back gear 58, the double gear being journaled on a stub shaft 69 projecting from bracket 71 also secured to plate 12. By this arrangement the two large gears on the winding head are rotated at different speeds.

Figure 5:
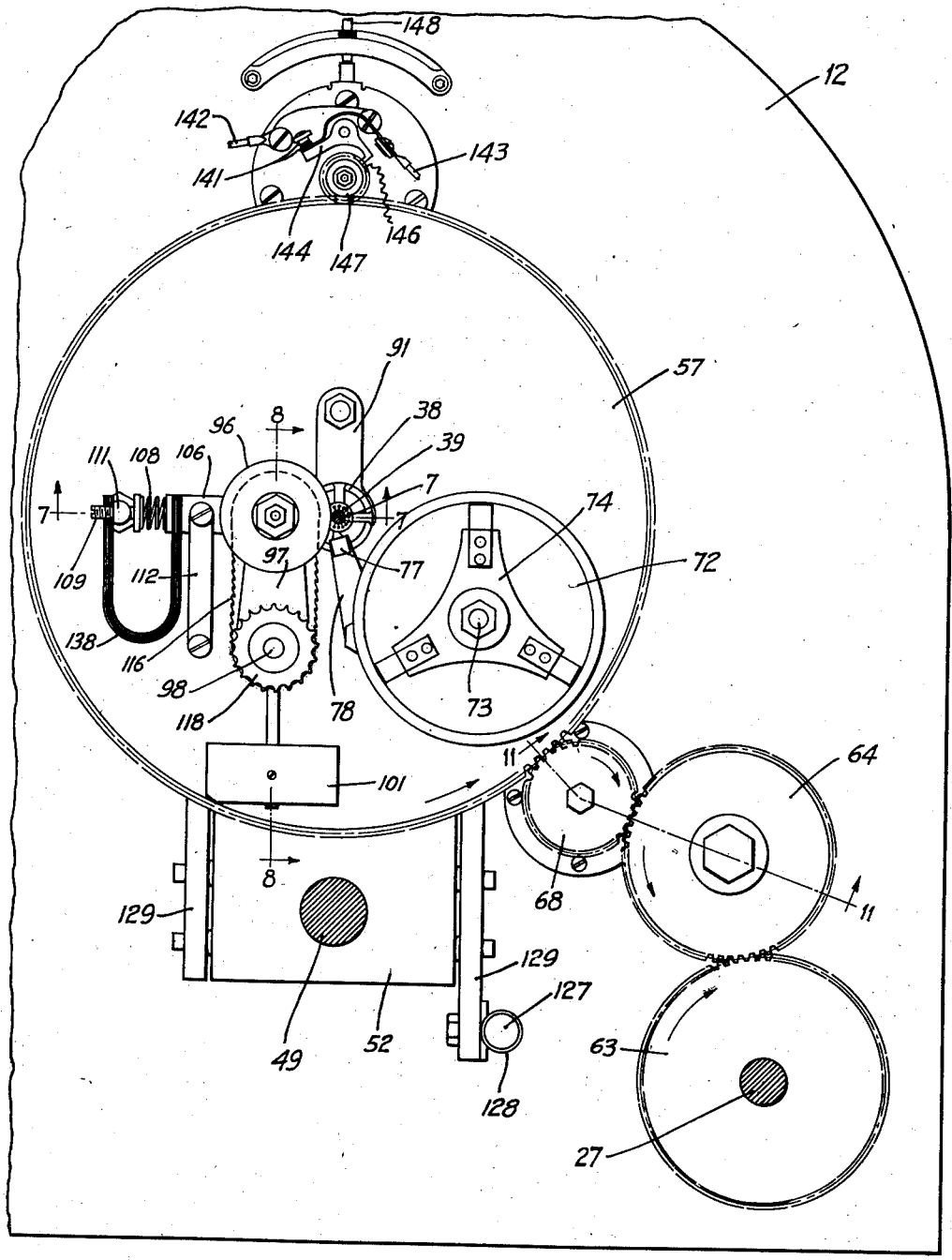
Figure 5 is a transverse vertical sectional view taken in a plane indicated by line 5—5 of Figure 3, showing the winding head.

Referring to Figures 5 and 6, the helical winding is applied by wire from a supply roll or reel 72 mounted on the winding head for movement in a path about the mandrel. The reel is journaled on a stub shaft 73 projecting from front gear 57 of the winding head, and is resiliently held by a spider 74 pressed by spring 76. Wire from this reel is directed onto the mandrel by an apertured guide tip 77 supported adjacent the mandrel by a bracket 78 mounted on the face of gear 57. The wire is thus applied as a helical wrapping over the longitudinal bars by reason of the combined rotational movement of the winding head and axial movement of the mandrel. Since one mandrel section follows immediately behind the other the grids are made continuously.

*Pitch varying mechanism.*—Means are provided for varying the pitch of the winding at intervals along the axis to form close-turn end rings 3 and 4 and open-turn helices 6 on the grids. To accomplish this the winding head 42 is moved axially relative to the mandrel by a cam mechanism. As shown in Figures 2, 3 and 6, a cam 81 engages a follower roller 82 on the end of slide rod 49. Contact between the follower and cam is maintained by a pair of springs 83 interposed between block 52 and plate 12. See Figure 10.

Cam 81 is carried by a shaft 84 journaled in housing 86 and connected to a cross shaft 87 by worm gearing 88. The cross shaft is in turn connected to main drive shaft 27 by a gear train 89. Winding head 42 is thus caused to move forward with but slightly slower rate than the mandrel to form a pair of adjacent end rings 3 and 4, the cam being shaped to slow down a portion of this movement to provide some space between the two adjacent end rings so that the grids may be subsequently separated at this point. On the return stroke of the winding head the latter moves contra to the mandrel and forms the open turn helix 6.

Guide tip 38 for the longitudinal wires is maintained closely adjacent to winding guide 77 by a yoke 91 secured to gear 57 and engaging a groove in tip 38 so that sleeve 36 slides back and forth with the winding head. Guide tip 38 is held against rotation by a fixed lug 92 engaging a slot 93 in the sleeve.

Figure 7:
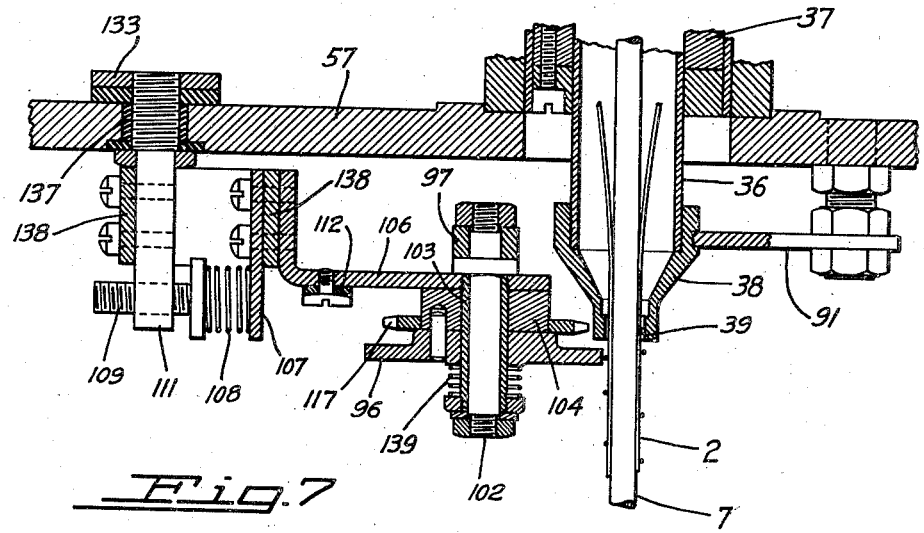
Figure 7 is a detail sectional view showing the welding roller mounting, taken in a plane indicated by line 7—7 of Figure 5.
Figure 8:
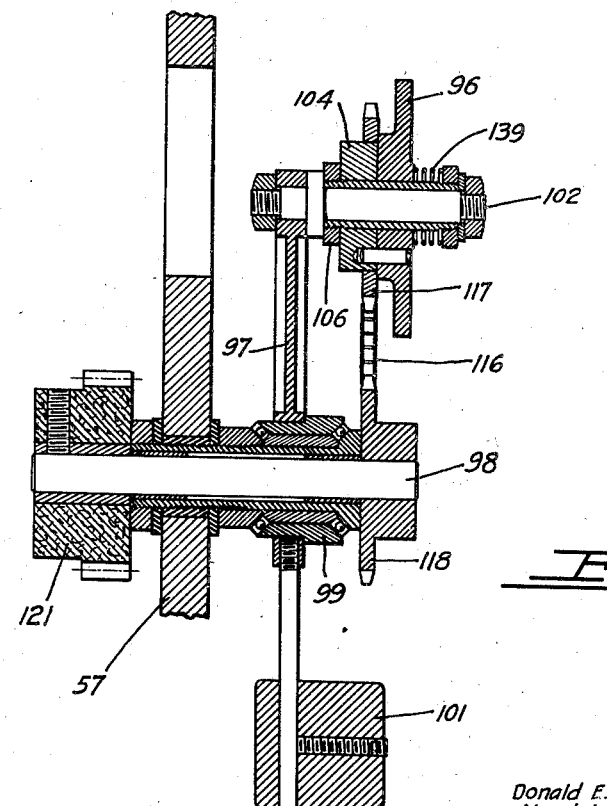
Figure 8 is another sectional view of this structure, taken in a plane indicated by line 8—8 of Figure 5.

*Welding mechanism.*—Means are provided for welding the wires together at their intersections immediately upon application of the helical winding. As seen in Figures 5, 7 and 8, a welding electrode or roller 96 is carried on one end of an arm 97 which swings about a shaft 98 on a bearing 99, the roller assembly being counterbalanced by a weight 101 to compensate for centrifugal force. Roller 96 is positioned to ride on the wire being wound and is arranged to engage each intersection immediately upon formation thereof at the point where the wire being wound approaches the mandrel.

Means are also provided for resiliently pressing welding roller 96 against the wire. The roller mount comprises an axle 102 fixed to arm 97 and carrying a sleeve 103 upon which roller 96 and its pinned hub 104 are journaled. A lateral arm 106 is threaded to sleeve 103 and has an inturned end secured to a strip 107 against which spring 108 bears. An adjusting screw 109 on a stud 111 secured to gear 57 provides means for varying the spring pressure on the welding roller. A third arm 112 pivoted between arm 106 and the face of gear 57 is arranged parallel to arm 97 to stabilize the linkage.

Means are further provided for positively driving welding roller 96 at a peripheral speed sufficient to maintain a non-slipping rolling contact between the roller and wire. This eliminates disturbing the positions of the wires, which would occur if frictional contact with the wire were relied upon to turn the roller. Referring to Figures 2, 5 and 8, a chain 116 is connected between a sprocket 117 on hub 104 and sprocket 118 on shaft 98. The latter shaft is driven by back gear 58 through a planetary gear system comprising sun gear 119 on sleeve 59 meshed with a planet pinion 121 on the rear end of shaft 98. By this arrangement the welding roller is independently driven at a predetermined rate to maintain the desired rolling contact between it and the wire.

Means are also provided for supplying electrical current to the necessary parts for making the welds. In order to complete the electrical circuit we use mandrel 7 as one of the welding electrodes, both the mandrel and roller electrode 96 being preferably of copper. Contact with the mandrel is made by a pair of brushes 122 pivoted to housing 22 (Figure 2) and held together against the mandrel by a spring 123. As shown in Figure 3, a conductor 124 extends from one of these brushes to the welding transformer 126. Another conductor 127 from the transformer leads to a terminal 128 on one of two conductive straps 129 supported by and insulated from block 52.

Straps 129 project upwardly to a slide contact device for feeding the current to the roller electrode. As shown in Figure 9 the contact device comprises a brush 131 connected to a strap 129 by a flexible conductor 132. Brush 131 slidably engages a conductive ring 133 secured to the back side of front gear 57 and insulated therefrom by an insulating ring 134. Brush pressure is maintained against ring 133 by a spring pressed arm 136 pivoted to the other upright strap 129. From collector ring 133 the current passes through stud 111 (Figure 7) which is also conductive and insulated from gear 57 by bushing 137. A flexible conductive strap 138 is connected between stud 111 and arm 106. To allow ample freedom of movement this strap is made in the form of a loop as seen in Figure 5. From arm 106 the current passes to roller electrode 96 by the contact surface between the arm and hub 104, the same being pressed together by a spring 139 interposed between the outer side of roller 96 and the end of axle 102.

*Welding timer.*—Means are provided for timing the intermittently applied welding current so that the current flows only during the interval when roller electrode 96 is on an intersection or crossover of the wires. Any well known means such as ignitrons may be employed in the primary circuit of the welding transformer for interrupting the current. We control the firing of the ignitrons by a timer switch shown in Figures 2 and 5 comprising a pair of contacts 141 one of which is fixed and connected to a lead 142 and the other of which is movable and connected to a lead 143. The movable contact is mounted on the arm of a bell crank 144, the other arm of which rides on a cam having a flat 146. This cam is rotated by a pinion 147 meshed with a back gear 58. Contacts 141 are normally held open by the bell crank arm riding on the cylindrical surface of the cam, but are closed once during each revolution when the crank arm rides on flat 146. Since pinion 147 runs in timed relation with the winding head, the opening and closing of the switch will function as means for timing the welding operation. Complete connections from leads 142 and 143 to a control circuit for the transformer are not shown as this will be clear to those skilled in the art. The timer device may be advanced and retarded by moving handle 148 to turn the entire switch about the axis of pinion 147, thus changing the instant at which the switch closes relative to the rotation of the pinion.

*Operation.*—Before starting the machine a mandrel is inserted through the winding head and the longitudinal wires 2 are threaded through their respective slots 39 in guide tip 38. The ends of these wires are secured or clamped to the end of the first mandrel by any suitable means so that when the machine is started the wires will be peeled from reels 31 and laid along the mandrel by axial movement of the latter. The wire from reel 72 is then threaded through its guide 77 and suitably secured about the mandrel so that when head 42 starts turning the wire will be wound.

The driving motor of shaft 27 is then started and the power for the welding circuit turned on. This starts the mandrel feeding through the machine by the driving action of rollers 18. Simultaneous rotation of winding head 42 applies the helical wrapping, each intersection being welded by the synchronized welding mechanism. New mandrel sections are fed, one behind the other, to drive rolls 17 so that grid fabrication proceeds continuously. As soon as a mandrel section advances a distance along the front guide trough 15 the mandrel is disconnected from the trailing one by cutting the wires at the junction between the mandrels. This is done while the mandrels are in motion and without stopping the machine.

The removed mandrel has a chain of say twenty-five or more grids on it. If the mandrel is sufficiently hard the individual grids may be cut apart directly on it by rolling under the knife 8 shown in Figure 1. Since the mandrel is used over and over it may be damaged by the knife, so we prefer to strip the chain of grids from the mandrel and slip them on a core of harder material for the cutting operation. The connected grids are easily stripped by applying tension at one end. If necessary, the grids may be first loosened by rolling the mandrel between two surfaces. After being separated the free ends of the wires are preferably trimmed up close to the end rings to produce the final grid as shown at the right in Figure 1.

From the above it is apparent that the method embodying our invention comprises the steps of laying a plurality of wires longitudinally of an axis to form bars for a connected series of grids, winding another wire helically about the bars, securing the wires together at intersections thereof, and then severing the wires in planes perpendicular to the axis to separate the grids. This provides a method whereby the grids may be made continuously. It is also apparent that our preferred method involves the additional steps of decreasing the pitch of the winding at intervals along the axis to provide close-turn end rings on the grids, and increasing the pitch at other intervals to provide open-turn helices between the end rings. Another feature of the method, hereinbefore described, is that the wires are secured together by passing a welding current through the intersections, utilizing the mandrel as one of the electrodes.

We claim:

1. The method of making grids, which comprises laying a plurality of wires longitudinally along a metallic mandrel to form bars for a connected series of grids, axially advancing the mandrel and said laid wires in unison, winding another wire about the mandrel, applying a welding electrode to an intersection of the wires at the point where the wire being wound approaches the mandrel, and passing an electric current through the electrode and mandrel and the interposed wires to weld the latter together.

2. The method of making grids, which comprises axially moving a mandrel, laying a plurality of wires longitudinally along the mandrel while the latter is in motion to form bars for a connected series of grids, winding another wire helically about the mandrel by moving a supply roll of said other wire in a path around the mandrel, moving said supply roll axially relative to the mandrel for varying the pitch of the winding, and securing the wires together at intersections thereof while the mandrel is in motion.

3. The method of continuously making grids, which comprises axially moving a series of aligned mandrels by applying a force to a trailing mandrel, whereby a leading mandrel is advanced by the trailing mandrel, laying wires longitudinally along the moving mandrels to form bars for a connected series of grids, winding another wire helically about the mandrels, uniting the wires at intersections thereof, severing the wires between mandrels and removing a mandrel from the leading end of the series, and introducing another mandrel at the trailing end of the series.

DONALD F. DRIESCHMAN.
GORDON SHEPHERD.
MENDEL RABINAWITZ.
ALMER M. NEWHALL, Jr.
HAROLD E. SORG.

REFERENCES CITED

The following references are of record in the file of this patent:

UNITED STATES PATENTS

| Number | Name | Date |
| --- | --- | --- |
| 1,976,522 | Rose, Jr. | Oct. 9, 1934 |
| 1,305,690 | Coyer | June 3, 1919 |
| 1,814,770 | Schenk et al. | July 14, 1931 |
| 1,835,114 | Kirby | Dec. 8, 1931 |
| 2,247,869 | Beers | July 1, 1941 |
| 1,198,349 | Heany | Sept. 12, 1916 |
| 1,365,015 | Zwicker | Jan. 11, 1921 |
| 1,928,534 | Halkyard et al. | Sept. 26, 1933 |
| 1,585,905 | Madden et al. | May 25, 1926 |

FOREIGN PATENTS

| Number | Country | Date |
| --- | --- | --- |
| 694,563 | Germany | Aug. 3, 1940 |